United States Patent
Schneider et al.

(10) Patent No.: US 8,589,946 B2
(45) Date of Patent: Nov. 19, 2013

(54) PREVENTION OF BROWSER TIMEOUT

(75) Inventors: Elena Schneider, Austin, TX (US); Jia Ming Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1217 days.

(21) Appl. No.: 12/206,476

(22) Filed: Sep. 8, 2008

(65) Prior Publication Data

US 2010/0064298 A1  Mar. 11, 2010

(51) Int. Cl.
 *G06F 3/00* (2006.01)
(52) U.S. Cl.
 USPC ............ 719/313; 719/312; 719/314; 719/317
(58) Field of Classification Search
 None
 See application file for complete search history.

(56) References Cited

U.S. PATENT DOCUMENTS

| | | | | |
|---|---|---|---|---|
| 5,774,668 | A * | 6/1998 | Choquier et al. | 709/223 |
| 5,809,235 | A * | 9/1998 | Sharma et al. | 709/230 |
| 6,012,090 | A * | 1/2000 | Chung et al. | 709/219 |
| 6,154,849 | A * | 11/2000 | Xia | 714/4.3 |
| 6,366,082 | B1 | 4/2002 | Moisio et al. | |
| 6,526,433 | B1 | 2/2003 | Chang et al. | |
| 6,529,939 | B1 * | 3/2003 | Kraft | 709/203 |
| 7,024,556 | B1 * | 4/2006 | Hadjinikitas et al. | 713/168 |
| 7,302,370 | B2 | 11/2007 | Nickerson et al. | |
| 7,330,894 | B2 | 2/2008 | Vallone | |
| 2001/0009018 | A1 * | 7/2001 | Iizuka | 710/11 |
| 2003/0097448 | A1 * | 5/2003 | Menezes et al. | 709/227 |
| 2004/0028025 | A1 * | 2/2004 | Chang | 370/352 |
| 2006/0069787 | A1 * | 3/2006 | Sinclair et al. | 709/229 |
| 2006/0155705 | A1 | 7/2006 | Kamper et al. | |
| 2007/0050477 | A1 | 3/2007 | Isaacs | |

OTHER PUBLICATIONS

Reis, C. et al., "Using Processes to Improve the Reliablity of Browser Based Applications," University of Washington Technical Report, UW-CSE-2007-12-01, pp. 1-13.
Chen, H. et al., "Session-Based Overload Control in QOS-Aware Web Servers," Proceedings of the Twenty-First Annual Joint Conference on the IEEE Computer and Communications Societies, vol. 2, pp. 516-524, 2002.

* cited by examiner

*Primary Examiner* — Emerson Puente
*Assistant Examiner* — Sisley Kim
(74) *Attorney, Agent, or Firm* — Griffiths & Seaton PLLC

(57) ABSTRACT

A method for preventing a browser timeout resulting from multiple requests sent from a client to a server is provided. In response to receiving a request from the client, an application thread is initialized on the server for submitting data to the client. The application thread is observed using a daemon observation thread. If a loading time of the application thread exceeds a timeout, the application thread is terminated. In response to terminating the application thread, an empty response is sent to the client. In response to receiving the empty response to the client, a determination is made whether to make an additional request to the server.

13 Claims, 3 Drawing Sheets

PREVENTION OF BROWSER TIMEOUT

BACKGROUND OF THE INVENTION

1. Technical Field

The present invention relates in general to computers, and more particularly to a method, system, and computer program product for preventing a browser timeout due to multiple requests sent from a client browser to a server.

2. Description of Related Art

Web applications are proliferating in today's society. For example, may computer programs that typically were installed on a user's local computer are now remotely hosted and presented to the user via a network using a browser application. Typically, a web browser application acts as a client. A servlet, or a similar application resides on a server to provide the web browser client with data that is requested. When an event occurs on a web page, such as clicking on a hyperlink, a number of requests may be made from the client to the server to provide data.

Web applications are becoming increasingly complex. As a result, an increasing number of requests may be made to a server for data at a particular time. In some cases, the response of the server to the client may be slow, and may cause client-side requests to timeout and be abandoned and/or canceled by a user. The problem of timeouts is particularly apparent in cases where more than two requests are sent from the client to the server at any one time. For example, on a tabbed page with multiple inline frames (IFrames) trying to retrieve data, all at one time, several different requests may be generated. These requests may then be queued to be sent to the server. In web browsers generally, if a request is queued but blocked by an unresponsive request further ahead in the queue for a length of time, the request will be abandoned and will not be resubmitted.

SUMMARY OF THE INVENTION

In light of the foregoing, a need exists for a mechanism to manage the queuing and sending of multiple requests to a server, particularly when the requests are unresponsive by the server. Accordingly, in one embodiment, by way of example only, a method for preventing a browser timeout resulting from multiple requests sent from a client to a server is provided. In response to receiving a request from the client, an application thread is initialized on the server for submitting data to the client. The application thread is observed using a daemon observation thread. If a loading time of the application thread exceeds a timeout, the application thread is terminated. In response to terminating the application thread, an empty response is sent to the client. In response to receiving the empty response to the client, a determination is made whether to make an additional request to the server.

In an additional embodiment, again by way of example only, a system for preventing a browser timeout resulting from multiple requests sent from a client to a server is provided. An application module is operable on the server. A request control module is operable on the client. The request control module is in communication with the application module. The application module is adapted for, responsive to receiving a request from the client, initializing an application thread on the server for submitting data to the client, observing the application thread using a daemon observation thread, if a loading time of the application thread exceeds a timeout, terminating the application thread, and responsive to terminating the application thread, sending an empty response to the client. The request control module is adapted for, responsive to receiving the empty response to the client, determining whether to make an additional request to the server.

In still another embodiment, again by way of example only, a computer program product is provided for preventing a browser timeout resulting from multiple requests sent from a client to a server. The computer program product comprises a computer-readable storage medium having computer-readable program code portions stored therein. The computer-readable program code portions comprise a first executable portion for, responsive to receiving a request from the client, initializing an application thread on the server for submitting data to the client, a second executable portion for observing the application thread using a daemon observation thread, a third executable portion for, if a loading time of the application thread exceeds a timeout, terminating the application thread, a fourth executable portion for, responsive to terminating the application thread, sending an empty response to the client, a fifth executable portion for, responsive to receiving the empty response to the client, determining whether to make an additional request to the server.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The present description and claimed subject matter describe exemplary system, method, and computer program product embodiments for prevention of browser timeouts resulting from multiple requests sent from a client to a server. The illustrated embodiments implement a backend observation thread operational on the server. The observation thread monitors the time spent by a request executing/retrying its data from the server. In the event that a configurable timeout is exceeded, a response is generated that is returned to the client. This response is referred to herein as an "empty" response. The empty response notifies the client that the response is unfulfilled. A request control framework is implemented on the client that, when such an empty request is received, determines if and/or when the request should be resubmitted to the server.

The request control framework may be configured to implement a maximum number of active requests to be submitted to the server at any one time. These active requests may be queued in a state designated to be submitted. Herein, this state is referred to as a "submitting" state. The remaining requests are sequestered in an inactive state and queued in an order. Once a response has been received for a submitting state request, the next queued request in the inactive state is transferred from the inactive state to the submitting state. In one exemplary embodiment, the maximum number of active requests at any one time may be set at two (2). The skilled artisan will appreciate that this maximum number may vary per a specific application or implementation, however.

Figure 1:
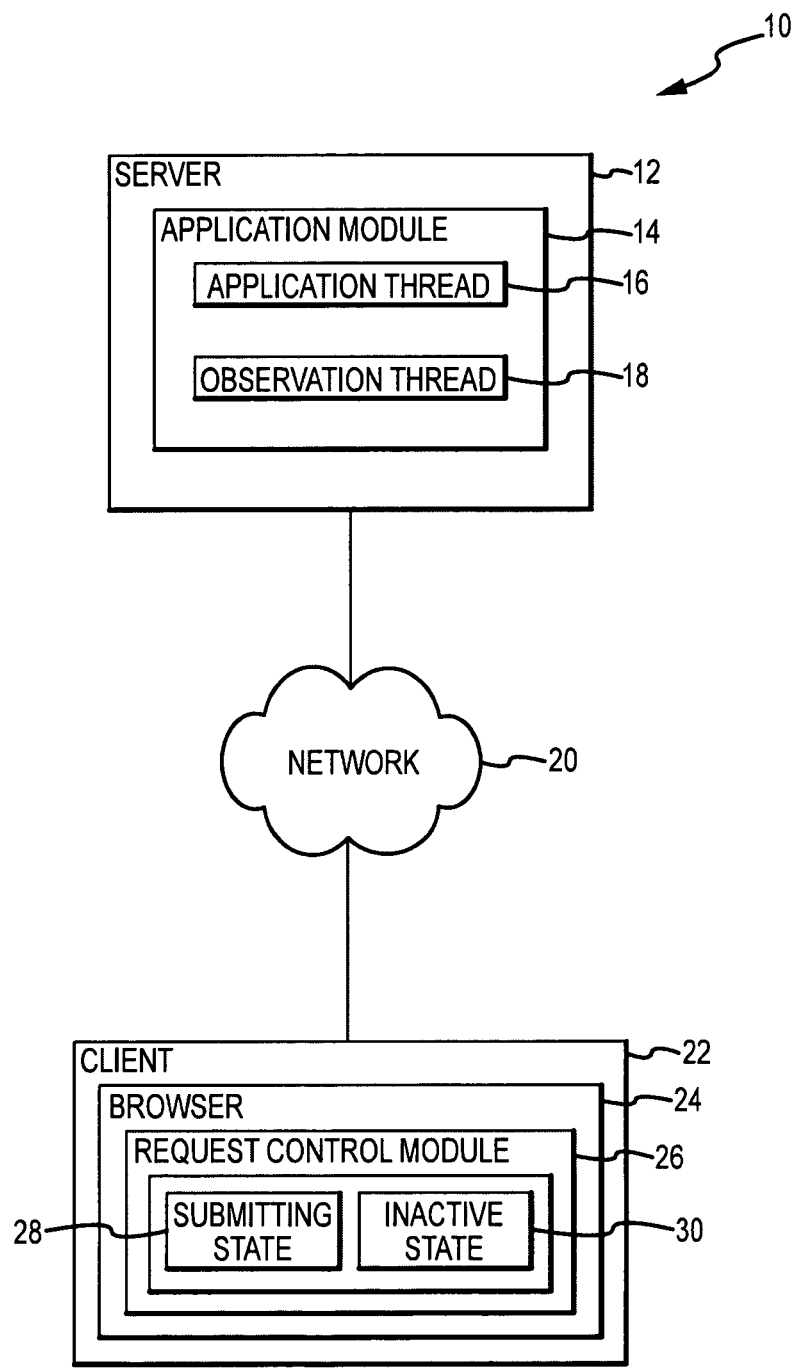
FIG. 1 is an exemplary server/client system in which various aspects of the following description and claimed subject matter may be implemented.

Referring to FIG. 1, a server/client system 10 is shown capable of implementing one or more aspects of the following description and claimed subject matter. A server 12 is in communication through a network 20 with a client 22. The server includes an application module 14 operational on the server. Application module 14 includes an application thread 16 and an observation thread 18. Each time a request is made from the client 22 to the server 12, an application thread 16 processes the request, and an observation thread 18 monitors the progress. Observation thread 18 may be configured as a daemon thread. In an implementation where two requests are concurrently processed, each request loads data in a separate application thread 16. Both application threads 16 are monitored by observation thread 18.

Client 22 includes a browser 24. A request control module 26, implementing a request control framework, is operable on, or in conjunction with, the browser 24. Request control module 26 includes submitting state 28, where a maximum number of active requests are queued as described previously. In addition, request control module 26 includes inactive state 30, where remaining requests are queued in an inactive state until each request is moved from the inactive state to the submitting state and submitted to the server 12.

On client 22, request control module 26 manages the request queuing and sending. At any time, the top maximum requests in the queue will be under the submitting state; and the other requests keep silent in the queue. On the server side, when the loading time of the one of the submitting state threads exceeds a configurable timeout, the request may be terminated and an empty response sent back to the client. The timeout time may be configurable. In one embodiment, timeout time may depend on the number of potential requests coming from the client. In this way, the next set of requests begins processing without the possibility of timing out while waiting for their turn on a client side.

Requests that are terminated due to long load time return back to the client with the empty response. Of course, the data still needs to be retrieved, since the data was unsuccessfully fetched during the initial attempt. The request control module 26, per the request control framework may determine if an additional request should be made. In one embodiment, a client side flag may be implemented in conjunction with the request control framework that reads from session data. The flag may be set on the server side.

Figure 2:
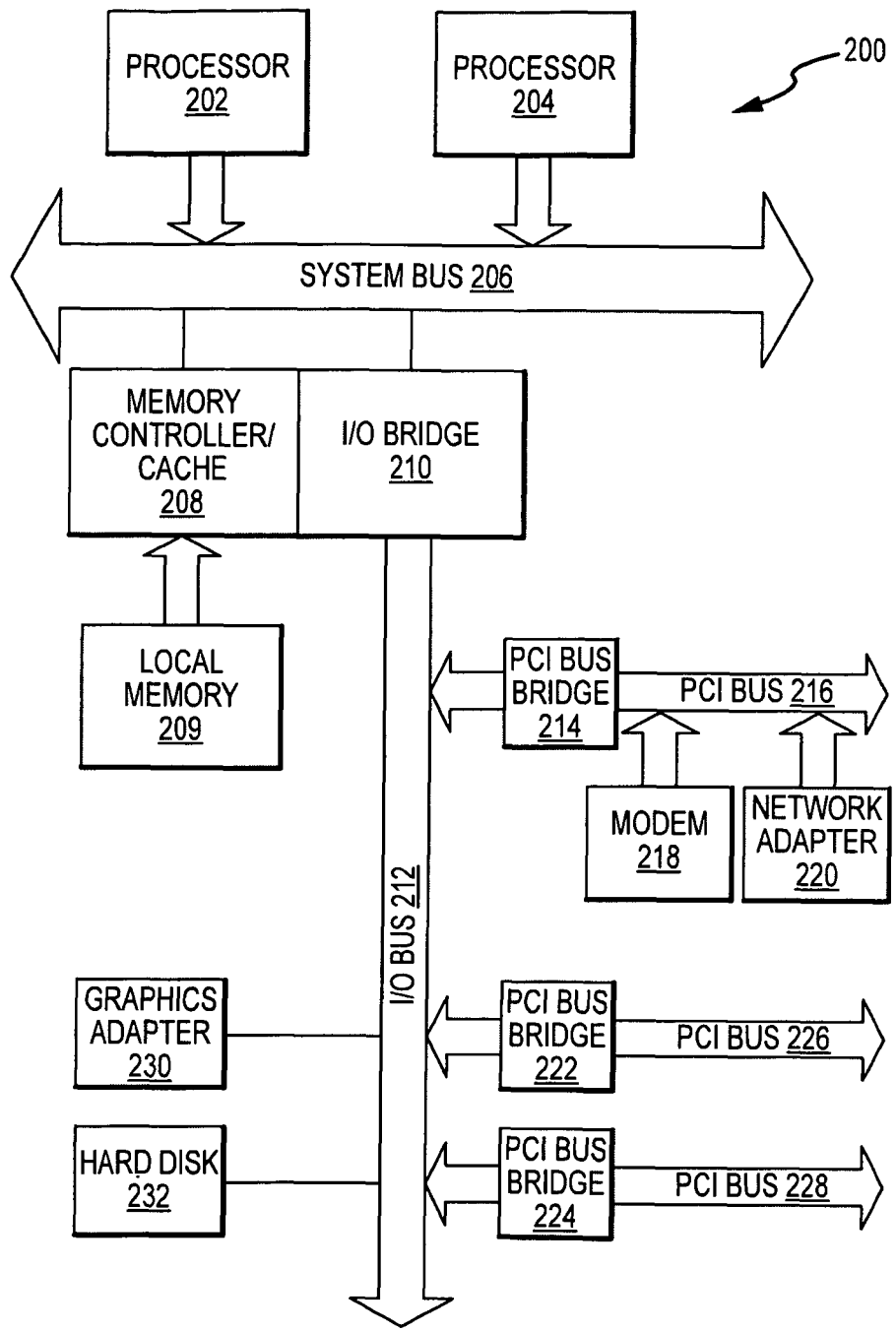
FIG. 2 is a block diagram of a data processing system that may be implemented as a server or a client.

Referring to FIG. 2, a block diagram of an exemplary data processing system 200 is illustrated that may be implemented as a server 12 or a client 22 in FIG. 1, in accordance with the present description and claimed subject matter. System 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

A peripheral component interconnect (PCI) bus bridge 214 connected to I/O bus 212 provides an interface to PCI local bus 216. Typical PCI bus implementations will support four PCI expansion slots or add-in connectors. Communications links to server 12 or client 22, depending on whether system 200 is a client 22 or server 12 (FIG. 1) may be provided through modem 218 and network adapter 220 connected to PCI local bus 216 through add-in connectors. Network adapter 220 may be connected to a local area network (LAN) and/or a wide area network (WAN) such as the world-wide-web (WWW) using a variety of communications protocols as the skilled artisan will appreciate, such as Ethernet.

In the case of system 200 configured as a server 12 (FIG. 1), additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer™ pSeries® system, a product of International Business Machines Corporation in Armonk, N.Y., running the Advanced Interactive Executive (AIX™) operating system or LINUX operating system.

Figure 3:
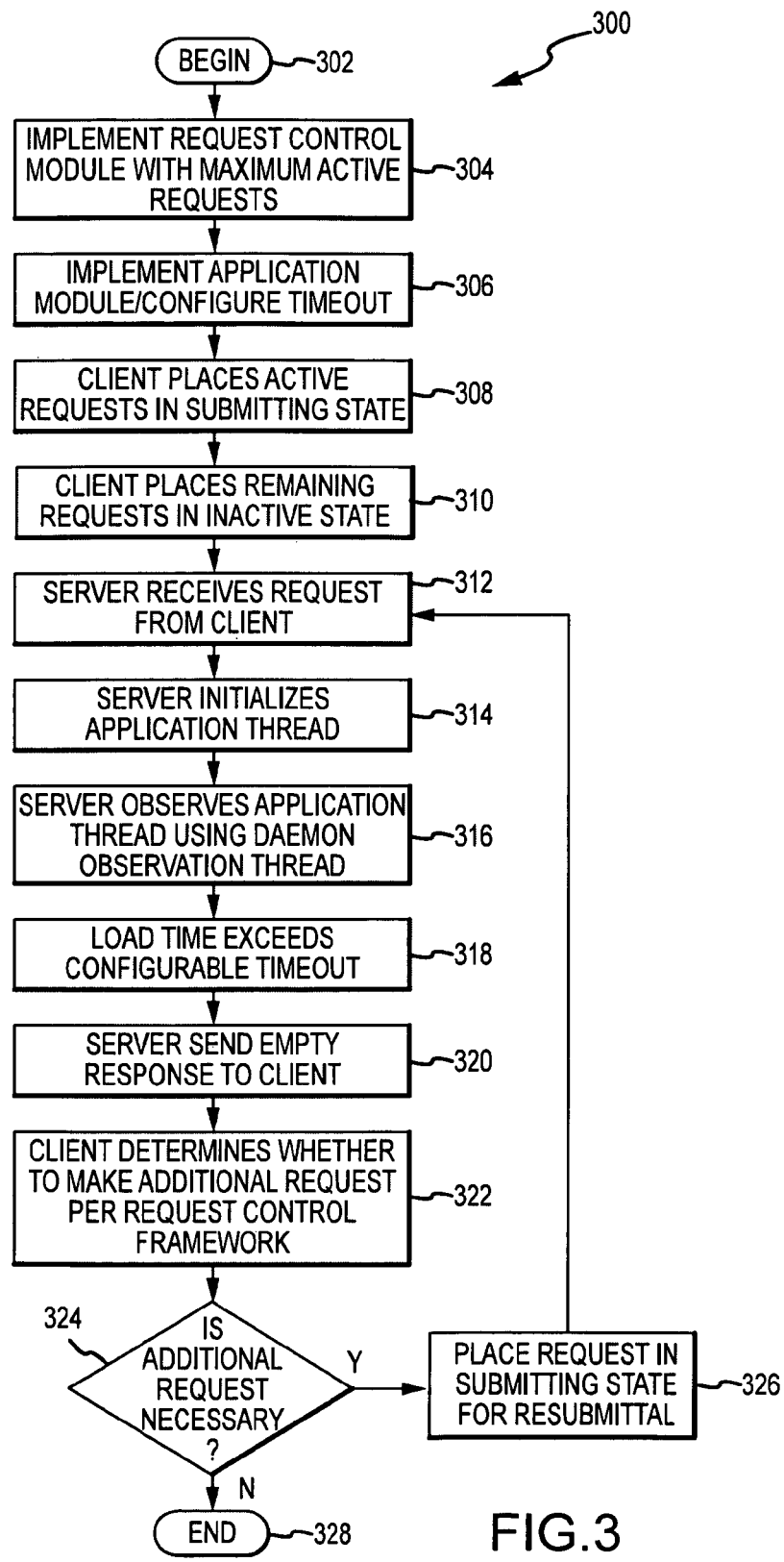
FIG. 3 is a flow chart diagram of an exemplary method for preventing a browser timeout resulting from multiple requests sent from a client to a server.

FIG. 3, following, is a flow chart diagram of an exemplary method for preventing a browser timeout resulting from multiple requests sent from a client to a server. As one skilled in the art will appreciate, various steps in the method may be implemented in differing ways to suit a particular application. In addition, the described method may be implemented by various means, such as hardware, software, firmware, or a combination thereof operational on or otherwise associated with the blade server environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Turning to FIG. 2, an exemplary method 300 for discovering hosts in a multi-blade server chassis is shown. Method 300 begins (step 302) with the implementation of a request control module having a request control framework (step 304) on the client. For example, the request control framework may implement a maximum number of active concurrent requests. An application module is implemented on the server (step 306). The application module may include a configurable timeout as described previously.

Control moves to step 308, where the client places the maximum number of active concurrent requests in the submitting state (step 308). In one embodiment, two requests are queued. The remaining requests are placed in the inactive state (Step 310) awaiting submittal.

The server receives the request(s) from the client (step 312). An application thread is initialized for each request (step 314). An observation thread observes the request(s) to determine, for example, if the requests are completed within the configurable timeout (step 316). In the event that one or more of the requests exceeds the timeout (step 318), the server sends an empty response, along with the request, back to the client (step 320).

The client receives the empty response, and per the request control framework, determines whether and/or when to make an additional request (step 322). If an additional request is to be made (decision 324), the request is then replaced into the submitting state for submittal at the appropriate time (step 326). The request is then resubmitted to the server, and steps 312-316 are repeated. If the load time of the request continues to exceed the timeout (again, step 318), the empty response is again sent to the client (again, step 320), and the client must again decide whether to make an additional request per the request control framework (again, step 322). If the client determines not to pursue an additional request, the method 300 ends (step 328).

If the resubmitted request is processed and does not exceed the timeout, an additional request residing in the inactive state is placed into the submitting state. In this way, each request in the inactive state is moved to the submitting state and submitted, until the requests have each been processed and all data has loaded.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for preventing a browser timeout resulting from at least one of a plurality of concurrent requests sent from a client to a server, comprising:
    responsive to receiving the at least one of a plurality of concurrent requests from the client, initializing an application thread on the server for submitting data to the client;
    observing the application thread using a daemon observation thread;
    if a loading time of the application thread exceeds a timeout, terminating the application thread;
    configuring the timeout based on a number of potential requests to be received from the client;
    responsive to terminating the application thread, sending an empty response to the client;
    allowing a next set of the at least one of a plurality of concurrent requests from the client to wait for processing without timing out based upon the configuring;
    responsive to receiving the empty response to the client, determining whether to make an additional request to the server,
    implementing a maximum number of the plurality of concurrent-requests to be concurrently active in a submitting state, and
    placing a plurality of concurrent remaining requests in an inactive state, wherein a first application and observation thread is initialized for a first request in the submitting state, and additional application and observation threads are initialized for additional requests in the submitting state.

2. The method of claim 1, wherein the maximum number of the plurality of concurrent requests to be concurrently active in the submitting state is two.

3. The method of claim 1, wherein implementing a maximum number of the plurality of concurrent requests to be concurrently active in a submitting state is performed by a request control framework operable on the client, the request control client adapted for defining the submitting and inactive states.

4. The method of claim 3, further including, subsequent to determining whether to make an additional request, placing the additional request in the submitting state to be resubmitted to the server.

5. A system for preventing a browser timeout resulting from at least one of a plurality of concurrent requests sent from a client to a server, comprising:
    an application module operable on the server; and
    a request control module operable on the client, the request control module in communication with the application module, wherein:
    the application module is adapted for, responsive to receiving at least one of a plurality of concurrent requests from the client, initializing an application thread on the server for submitting data to the client,
    observing the application thread using a daemon observation thread,
    if a loading time of the application thread exceeds a timeout, terminating the application thread,
    configuring the timeout based on a number of potential requests to be received from the client,
    allowing a next set of the at least one of a plurality of concurrent requests from the client to wait for processing without timing out based upon the configuring,
    responsive to terminating the application thread, sending an empty response to the client,
    the request control module is adapted for, responsive to receiving the empty response to the client, determining whether to make an additional request to the server,
    wherein the request control module is further adapted for:

implementing a maximum number of the plurality of concurrent requests to be concurrently active in a submitting state, and placing a plurality of concurrent remaining requests in an inactive state, wherein a first application and observation thread is initialized for a first request in the submitting state, and additional application and observation threads are initialized for additional requests in the submitting state.

6. The system of claim 5, wherein the maximum number of the plurality of concurrent requests to be concurrently active in the submitting state is two.

7. The system of claim 5, wherein the application module is further adapted for configuring the timeout based on a number of potential requests to be received by the client.

8. The system of claim 5, wherein the request control client is further adapted for defining the submitting and inactive states.

9. The system of claim 8, wherein the request control module is further adapted for, subsequent to determining whether to make an additional request, placing the additional request in the submitting state to be resubmitted to the server.

10. A computer program product for preventing a browser timeout resulting from at least one of a plurality of concurrent requests sent from a client to a server, the computer program product comprising a non-transitory computer-readable storage medium having computer-readable program code portions stored therein, the computer-readable program code portions comprising:

a first executable portion for, responsive to receiving at least one of a plurality of concurrent requests from the client, initializing an application thread on the server for submitting data to the client;

a second executable portion for observing the application thread using a daemon observation thread;

a third executable portion for, if a loading time of the application thread exceeds a timeout, terminating the application thread;

a fourth executable portion for, responsive to terminating the application thread, sending an empty response to the client;

a fifth executable portion for, responsive to receiving the empty response to the client, determining whether to make an additional request to the server;

a sixth executable portion for allowing a next set of the at least one of a plurality of concurrent requests from the client to wait for processing without timing out based upon the configuring;

a seventh executable portion for configuring the timeout based on a number of potential requests to be received from the client, an eighth executable portion for implementing a maximum number of the plurality of concurrent requests to be concurrently active in a submitting state, and a ninth executable portion for placing a plurality of currently remaining requests in an inactive state, wherein a first application and observation thread is initialized for a first request in the submitting state, and additional application and observation threads are initialized for additional requests in the submitting state.

11. The computer program product of claim 10, wherein the maximum number of the plurality of concurrent requests to be concurrently active in the submitting state is two.

12. The computer program product of claim 10, further including a tenth executable portion for defining the submitting and inactive states.

13. The computer program product of claim 12, further including an eleventh executable portion, subsequent to determining whether to make an additional request, placing the additional request in the submitting state to be resubmitted to the server.

* * * * *